(12) United States Patent
Norris et al.

(10) Patent No.: US 11,591,949 B2
(45) Date of Patent: Feb. 28, 2023

(54) AFTERTREATMENT SYSTEM WITH GAS SENSOR DOWNSTREAM OF A HEATER

(71) Applicant: Cummins Emission Solutions Inc., Columbus, IN (US)

(72) Inventors: Colin L. Norris, Columbus, IN (US); Andrew W. Osburn, Nashville, IN (US); Ryan M. Johnson, Cottage Grove, WI (US); Todd A. Corbet, Franklin, IN (US); Kyle Robert Fath, Columbus, IN (US); Lindsey R. Henry, Oregon, WI (US); Baseer Faalzada, Sun Prairie, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/682,606

(22) Filed: Feb. 28, 2022

(65) Prior Publication Data

US 2022/0282658 A1    Sep. 8, 2022

Related U.S. Application Data

(60) Provisional application No. 63/155,462, filed on Mar. 2, 2021.

(51) Int. Cl.
| | |
|---|---|
| *F01N 13/00* | (2010.01) |
| *F01N 11/00* | (2006.01) |
| *F01N 3/02* | (2006.01) |
| *F01N 3/10* | (2006.01) |
| *F01N 3/20* | (2006.01) |
| *F01N 3/021* | (2006.01) |

(52) U.S. Cl.
CPC .......... *F01N 13/008* (2013.01); *F01N 3/021* (2013.01); *F01N 3/103* (2013.01); *F01N 3/2066* (2013.01); *F01N 11/002* (2013.01); *F01N 2560/20* (2013.01)

(58) Field of Classification Search
CPC ........ F01N 3/021; F01N 3/103; F01N 3/2066; F01N 3/035; F01N 13/008; F01N 11/00; F01N 11/002; F01N 9/00; F01N 2560/20; F01N 2560/026; F01N 2560/025; F01N 2240/16; Y02T 10/12; Y02T 10/40
See application file for complete search history.

(56) References Cited

U.S. PATENT DOCUMENTS

| | | | |
|---|---|---|---|
| 5,357,752 | A | 10/1994 | Lucchesi |
| 5,564,273 | A | 10/1996 | Shah |

(Continued)

OTHER PUBLICATIONS

Search and Examination Report issued in United Kingdom Patent Application No. GB 2202773.4 dated Jul. 26, 2022.

*Primary Examiner* — Audrey B. Walter
*Assistant Examiner* — Dapinder Singh
(74) *Attorney, Agent, or Firm* — Foley & Lardner LLP

(57) ABSTRACT

An aftertreatment system for treating constituents of an exhaust gas produced by an engine includes a heater configured to selectively heat the exhaust gas entering the aftertreatment system. An aftertreatment component is disposed downstream of the heater. A gas sensor is disposed downstream of the heater and upstream of the aftertreatment component. The gas sensor comprises a sensing element, and a heating element configured to selectively heat the sensing element to an operating temperature of the sensing element.

18 Claims, 6 Drawing Sheets

(56) References Cited

U.S. PATENT DOCUMENTS

| | | | |
|---|---|---|---|
| 5,732,550 A | | 3/1998 | Muramatsu et al. |
| 5,740,675 A | * | 4/1998 | Shimasaki ............ F01N 3/2013 60/284 |
| 9,512,756 B2 | * | 12/2016 | Boggs ..................... F01N 3/035 |
| 9,605,578 B1 | * | 3/2017 | Qi .......................... F01N 3/023 |
| 11,022,017 B2 | * | 6/2021 | Kobayashi .............. F01N 11/00 |

* cited by examiner

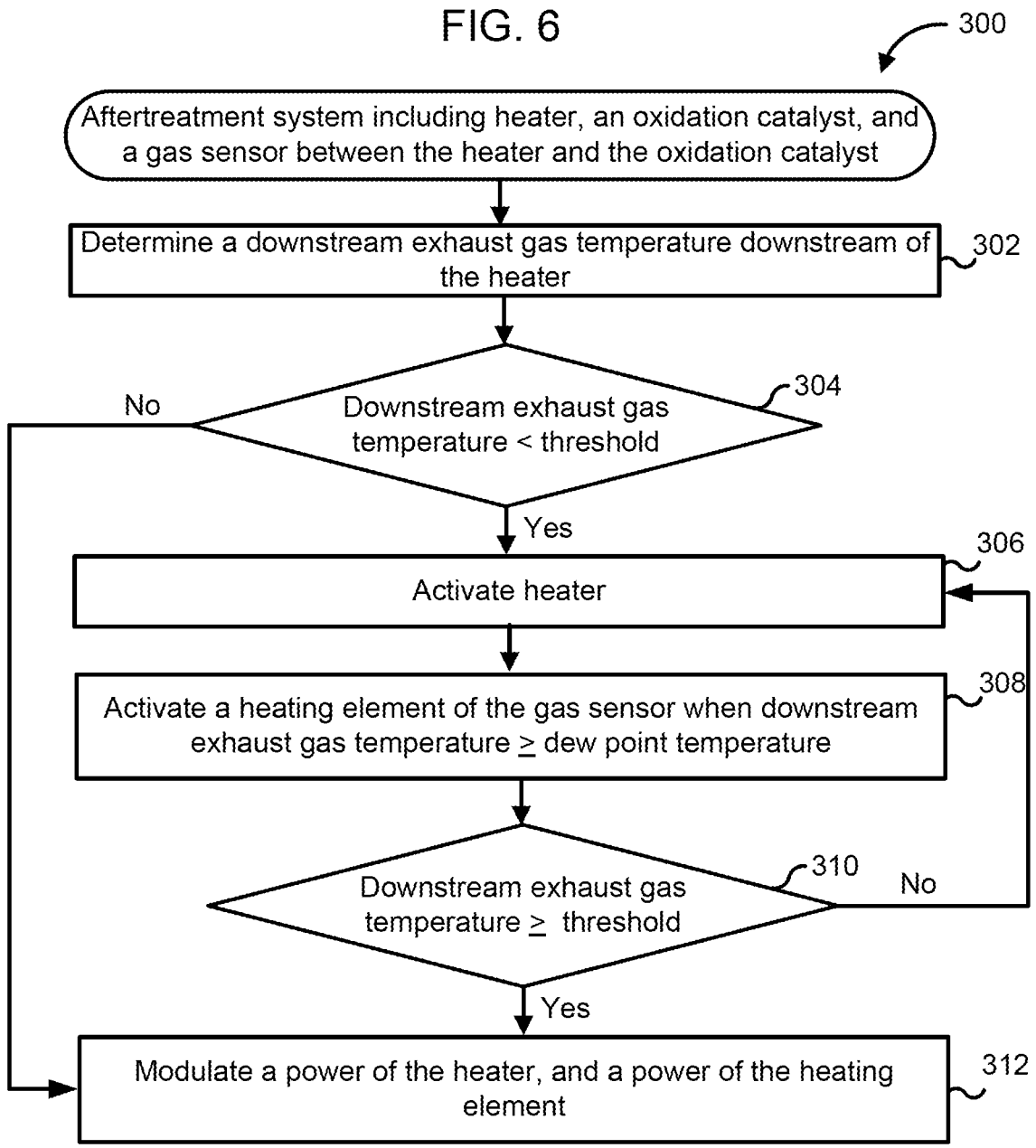

AFTERTREATMENT SYSTEM WITH GAS SENSOR DOWNSTREAM OF A HEATER

CROSS-REFERENCE TO RELATED APPLICATION

The present application claims the benefit of U.S. Provisional Application No. 63/155,462, filed Mar. 2, 2021, the entire disclosure of which is incorporated herein by reference.

TECHNICAL FIELD

The present disclosure relates generally to aftertreatment systems for use with internal combustion engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines includes a SCR system formulated to convert NOx (NO and $NO_2$ in some fraction) into harmless nitrogen gas ($N_2$) and water vapor ($H_2O$) in the presence of ammonia ($NH_3$). Measuring an amount of constituents of the exhaust gases, such as NOx gases and/or ammonia, is desirable for efficient insertion of reductant in aftertreatment systems, as well as to ensure that the aftertreatment system meets emission requirements. Gas sensors are generally used to measure amount of various constituents of a gas. For example, NOx sensors are used to measure an amount or level of NOx gases in the exhaust gas entering and/or exiting the aftertreatment system. Such gas sensors generally include a sensing element and a heating elements, such as a ceramic sensing element and a ceramic heating element enclosed in a housing. Under cold environmental conditions, water can condense on the sensing element and the heating element in the form of droplets. Turning ON or activating the gas sensor before the condensed water has evaporated can lead to cracking of the sensing element and the heating element due to thermal stress.

SUMMARY

Embodiments described herein relate generally to systems and methods for reducing failure of gas sensors included in aftertreatment systems. In particular, embodiments described herein relate to aftertreatment systems that include at least a heater, an aftertreatment component (e.g., an oxidation catalyst) downstream of the heater, and a gas sensor disposed between the heater and the aftertreatment component. The heater is configured to selectively heat the exhaust gas which in turn heats the gas sensor located downstream of the heater to above a dew point temperature so as to allow faster activation of a heating element of the gas sensor. Embodiments described herein also allow maintaining of the gas sensor at its operating temperature while reducing power consumption from the heating element, thereby increasing operational life of the gas sensor.

In some embodiments, an aftertreatment system for treating an exhaust gas produced by an engine, comprises: a heater configured to selectively heat the exhaust gas entering the aftertreatment system; an aftertreatment component disposed downstream of the heater; and a gas sensor disposed downstream of the heater and upstream of the aftertreatment component, the gas sensor comprising: a sensing element, and a heating element configured to selectively heat the sensing element to an operating temperature of the sensing element.

In some embodiments, a controller for an aftertreatment system that comprises an aftertreatment component, a heater disposed upstream of the aftertreatment component, and a gas sensor comprising a sensing element and a heating element disposed downstream of the heater and upstream of the aftertreatment component, is configured to: determine an upstream exhaust gas temperature of the exhaust gas upstream of the heater; in response to the upstream exhaust gas temperature being less than a first threshold, cause activation of the heater; determine a downstream exhaust gas temperature of the exhaust gas downstream of the heater; and in response to the downstream exhaust gas temperature being equal to or greater than the first threshold, cause activation of the heating element of the gas sensor.

In some embodiments, a method, comprises: determining, by a controller, an upstream exhaust gas temperature of an exhaust gas flowing through an aftertreatment upstream of a heater of the aftertreatment system, the aftertreatment system comprising a gas sensor comprising a sensing element and a heating element disposed downstream of the heater and upstream of an aftertreatment component of the aftertreatment system; in response to the upstream exhaust gas temperature being less than a first threshold, causing, by the controller, activation of the heater; determining, by the controller, a downstream exhaust gas temperature of the exhaust gas downstream of the heater; and in response to the downstream exhaust gas temperature being equal to or greater than the first threshold, causing, by the controller, activation of the heating element of the gas sensor.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 6 is a schematic flow chart of a method for thermal management of a gas sensor included in an aftertreatment system, according to another embodiment.

Figure 1:
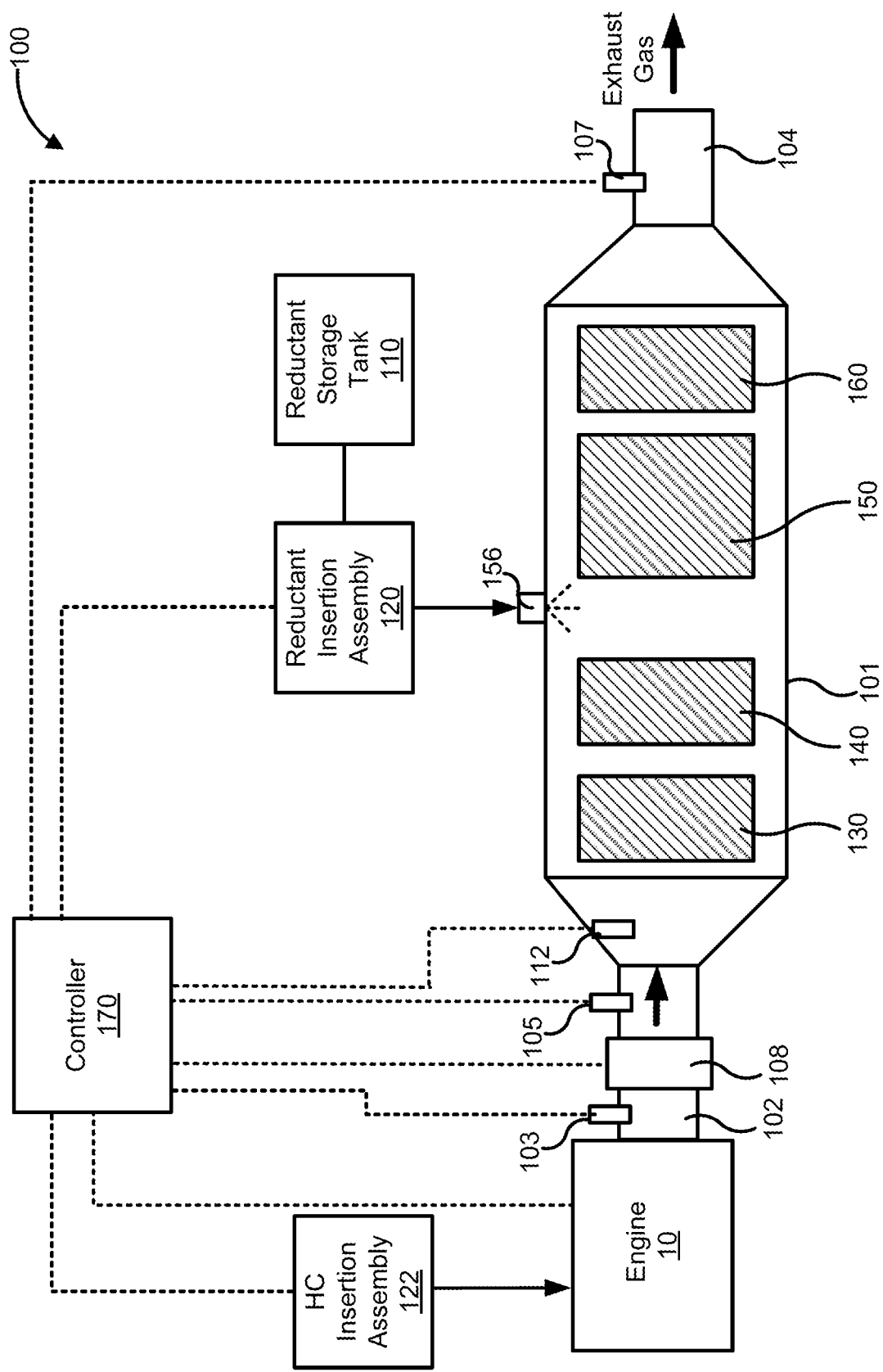
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for reducing failure of gas sensors included in aftertreatment systems. In particular, embodiments described herein relate to aftertreatment systems that include at least a heater, an aftertreatment component (e.g., an oxidation catalyst) downstream of the heater, and a gas sensor disposed between the heater and the aftertreatment component. The heater selectively heats the exhaust gas which in turn heats the gas sensor located downstream of the heater to above a dew point temperature at or above which water condensed on the heating element evaporates (e.g., 100 degrees Celsius) so as to allow faster activation of a heating element of the gas sensor, as well as allow maintaining of the gas sensor at its operating temperature while reducing power consumption from the heating element, thereby increasing operational life of the gas sensor.

Measuring an amount of constituents of the exhaust gases, such as NOx gases and/or ammonia, is desirable for efficient insertion of reductant in aftertreatment systems and to control emissions. Gas sensors are generally used to measure amount of various constituents of an exhaust gas. For example, NOx sensors are used to measure an amount or level of NOx gases in the exhaust gas entering and/or exiting the aftertreatment system. Such gas sensors generally include a sensing element and a heating elements, such as a ceramic sensing element and a ceramic heating element enclosed within a housing. Under cold environmental conditions, water can condense on the sensing element and the heating element in the form of droplets. Turning ON or activating the gas sensor before the condensed water has evaporated can lead to cracking of the sensing element and the heating element due to thermal stress.

To address this issue, a temperature of the exhaust gas at a location where gas sensor is disposed should be above a threshold temperature (e.g., the dew point temperature) to ensure that any condensate is evaporated from the heating and sensing elements before the heating element is activated. However, this can be an issue when exhaust gas temperature is low, particularly at engine startup, when it can take more than 120 seconds before the exhaust gas heats up to the threshold temperature at which the condensate evaporates, after which at least the heating element can be activated. A virtual sensor (e.g., calculations based on algorithms or lookup tables) can be used during this time period to estimate the NOx amount in the exhaust gas entering the aftertreatment system. However, such virtual determination of the NOx amount lacks the accuracy provided by a physical sensor, and thereby results in less accurate emission control, which may result in failure to meet NOx emission requirements.

Figure 4:
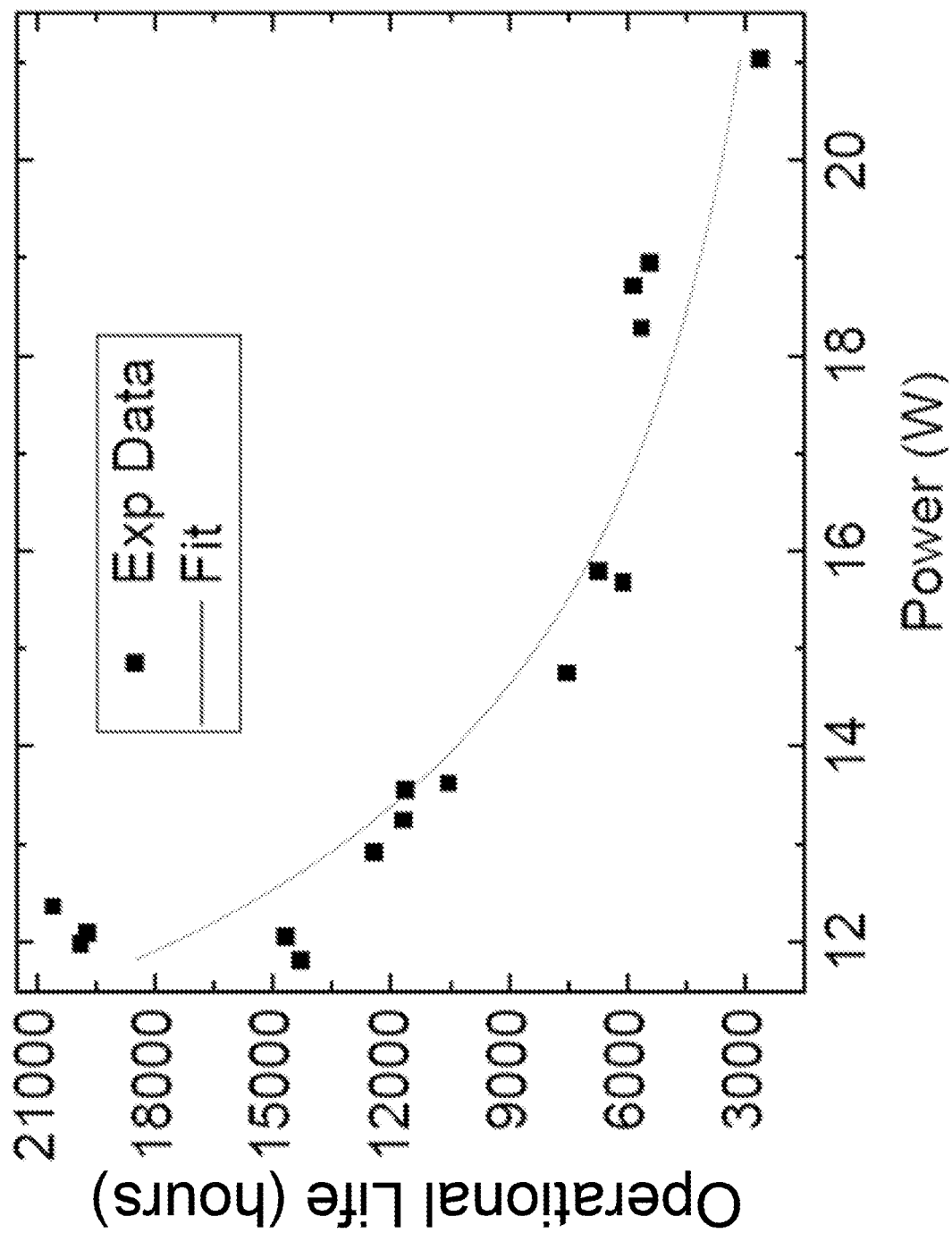
FIG. 4 is a plot of power consumption by a heating element of a gas sensor and the operational life of the gas sensor.

Moreover, gas sensors such as NOx sensors are often designed to operate at high operating temperatures, for example, equal to or higher than 600 degrees Celsius. For example, the heating element of a NOx sensor is used to heat the sensing element to the operating temperature at which sensing of NOx gases can be performed. However, average power consumption of the heating element is correlated to operational life of the sensor, and higher power consumption by the heating element can lead to early failure of the heating element and thus, the NOx sensor. For example, FIG. 4 is a plot of power consumption by a heating element of a NOx sensor and the operational life of the NOx sensor. As seen in FIG. 4, as more power is consumed by the heating element of the NOx sensor to heat the NOx sensor to the operating temperature, the operational life of the NOx sensor drastically decreases, which is undesirable.

In contrast, various embodiments of the systems and methods described herein for thermal management of gas sensors may provide one or more benefits including, for example: (1) disposing a physical gas sensor between a heater and an aftertreatment component such as an oxidation catalyst, thereby allowing the heater to heat exhaust gas flowing towards the gas sensor allowing the exhaust gas to heat the gas sensor to above its dew point temperature; (2) reducing time for heating the gas sensor to at or above the dew point temperature, thereby reducing the time for activating the heating element of the gas sensor after engine startup, or when exhaust gas temperature entering the aftertreatment system is low, allowing accurate determination of exhaust gas constituent amount (e.g., NOx amount) and better emission control; (3) allowing more accurate determination of exhaust gas constituents by positioning the gas sensor upstream of the oxidation catalyst, where exhaust gas formulation remains unchanged; (4) reducing local velocities of the exhaust gas around tip of the gas sensor by disposing the gas sensor within a housing of the aftertreatment system that has a larger cross-section and lower exhaust gas velocity reducing convective thermal loss and, thereby power required by heating element of the gas sensor to raise and maintain a temperature of the sensing element at its operating temperature; (5) reducing power required by heating element of the gas sensor to raise and maintain a temperature of the sensing element at its operating temperature by additionally modulating heater power to heat exhaust gas flowing towards the gas sensor; and (6) increasing operational life of the gas sensor by reducing amount of power needed by the heating element of the gas sensor.

FIG. 1 is a schematic illustration of an aftertreatment system 100, according to an embodiment. The aftertreatment system 100 is configured to receive exhaust gas (e.g., diesel exhaust gas) from an engine 10 and treat constituents (e.g., NOx, CO, $CO_2$) of the exhaust gas. The aftertreatment system 100 includes a heater 108, a gas sensor 112, an oxidation catalyst 130, and may also include a reductant storage tank 110, a reductant insertion assembly 120, a filter 140, a SCR system 150, a controller 170, an ammonia oxidation (AMOx) catalyst 160, and a hydrocarbon insertion assembly 122.

The engine 10 may include, for example, a diesel engine, a gasoline engine, a natural gas engine, a dual fuel engine, a biodiesel engine, an E-85 engine, or any other suitable engine). In some embodiments, the engine 10 includes a diesel engine. The engine 10 combusts fuel and generates an exhaust gas that includes NOx, CO, $CO_2$, and other constituents. The engine 10 may include other components, for example, a transmission, fuel insertion assemblies, a generator or alternator to convert the mechanical power produced by the engine into electrical power (e.g., to power the heater 108, the gas sensor 112, the reductant insertion assembly 120, the hydrocarbon insertion assembly 122, and the controller 170), etc.

The aftertreatment system 100 includes a housing 101 within which various aftertreatment components of the aftertreatment system 100 are disposed. The housing 101 may be formed from a rigid, heat-resistant and corrosion-resistant material, for example stainless steel, iron, aluminum, metals, ceramics, or any other suitable material. The housing 101 may have any suitable cross-section, for example, circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to remove particulate matter such as soot by the filter 140 and/or reduce constituents of the exhaust gas such as $NO_x$ gases, CO, unburnt hydrocarbons, etc. included in the exhaust gas by the SCR system 150 and the oxidation catalyst 130).

The heater 108 is disposed upstream of the other aftertreatment components, for example, in the inlet conduit 102 proximate to an engine exhaust manifold (e.g., at an outlet of a turbo coupled to the engine 10). The heater 108 may be an electrical heater, which may have a heater power in a range of 2 kilowatts (kW) to 60 kW (i.e., the electrical power consumed by the heater 108 to generate heat). The heater 108 is configured to selectively heat the exhaust gas entering the aftertreatment system 100, such that heating of the exhaust gas by the heater 108 causes an increase in a temperature of a heating element of the gas sensor 112 as the heated exhaust gas flows over the gas sensor. For example, the heater 108 can be selectively activated to heat the exhaust gas flowing therethrough towards the gas sensor 112 and the aftertreatment components, and thereby heat the gas sensor 112, as well as downstream aftertreatment components (e.g., heat the oxidation catalyst 130 to a light-off temperature, heat the SCR system to its operating temperature, etc.).

A first temperature sensor 103 may be positioned in the inlet conduit 102 upstream of the heater 108. The first temperature sensor is configured to measure an upstream exhaust gas temperature of the exhaust gas upstream of the heater 108. In some embodiments, a second temperature sensor 105 is also disposed downstream of the heater 108, for example, proximate to an outlet of the heater 108 and configured to measure a downstream exhaust gas temperature of the exhaust gas downstream of the heater 108. In some embodiments, other sensors, for example, pressure sensors, oxygen sensors or any other sensors configured to measure one or more operational parameters of the exhaust gas entering the aftertreatment system 100 may be disposed in the inlet conduit 102. In some embodiments, each of the first temperature sensor 103 and the second temperature sensor 105 may be excluded, and instead, the upstream and downstream exhaust gas temperatures may be determined virtually (e.g., by the controller 170), using equations, algorithms, or look up tables, for example, based on operating parameters of the engine 10 exhaust gas flow rate, heater power consumed, etc.

Wiring for the heater 108 is separated from wiring for the gas sensor 112, the first temperature sensor 103, and the second temperature sensor 105. For example, wiring for the heater 108 may be separated by a distance of at least 100 millimeters from wiring of any of the gas sensor 112, the first temperature sensor 103, or the second temperature sensor 105. Additionally or alternatively, a grounding shield may be included between the wiring for the heater 108 and wiring for any of the gas sensor 112, the first temperature sensor 103, or the second temperature sensor 105.

The oxidation catalyst 130 is disposed downstream of the heater 108 in the housing 101 and configured to decompose unburnt hydrocarbons and/or CO included in the exhaust gas. In some embodiments, the oxidation catalyst 130 may include a diesel oxidation catalyst. The hydrocarbon insertion assembly 122 is configured to selectively insert hydrocarbons (e.g., the same fuel that is being consumed by the engine 10) upstream of the oxidation catalyst 130, for example, into the engine 10. When a temperature of the oxidation catalyst 130 is equal to or above a light-off temperature of the oxidation catalyst 130, it catalyzes combustion of the inserted hydrocarbons so as to cause an increase in the temperature of the exhaust gas. In some embodiments, the hydrocarbon insertion assembly 122 may be selectively activated (e.g., by the controller 170) to insert hydrocarbons into the oxidation catalyst 130 for heating the exhaust gas and thereby, the downstream filter 140 and SCR system 150. In some embodiments, insertion of the hydrocarbons may heat the exhaust gas to a sufficient temperature to regenerate the filter 140 by burning off particulate matter that may have accumulated on the filter 140, and/or regenerate the SCR system 150 by evaporating reductant deposits deposited on the SCR system 150 or internal surfaces of the aftertreatment system 100.

A gas sensor 112 (e.g., a NOx sensor) is disposed in the housing 101 downstream of the heater 108 and upstream of any aftertreatment component that treats the constituents of the exhaust gas. For example, as shown in FIG. 1, the gas sensor 112 is disposed downstream of the heater 108 and upstream of the oxidation catalyst 130. Thus, the formulation of the exhaust gas flowing into the gas sensor 112 remains unchanged such that the exhaust gas constituent (e.g., NOx amount) measured by the exhaust gas is an accurate representation of an amount of exhaust gas constituent emitted by the engine 10.

Figure 2:
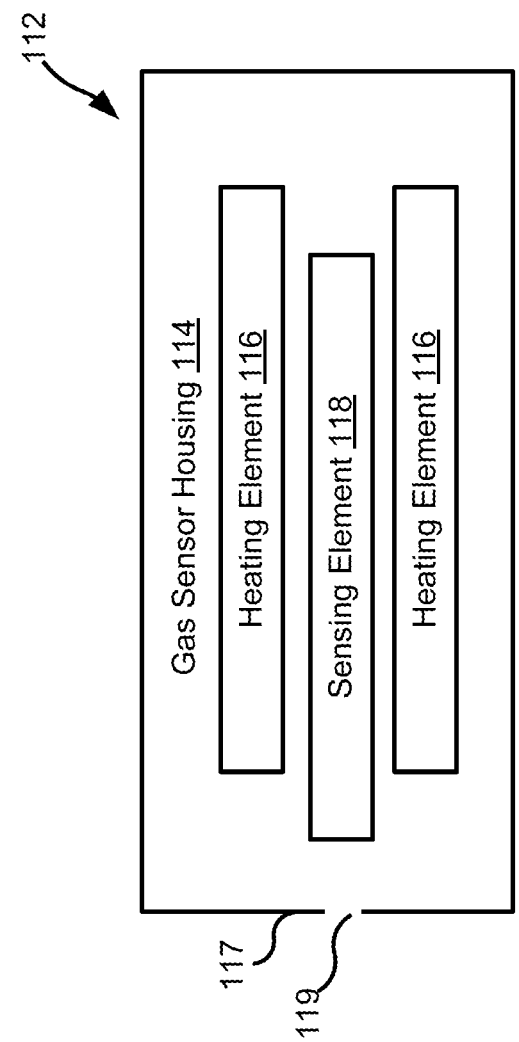
FIG. 2 is a schematic block diagram of a gas sensor included in the aftertreatment system of FIG. 1, according to an embodiment.

The gas sensor 112 includes a sensing element, and a heating element configured to selectively heat the sensing element to an operating temperature of the sensing element. For example, FIG. 2 shows a schematic block diagram of the gas sensor 112, according to an embodiment. As shown in in FIG. 2, the gas sensor 112 includes a gas sensor housing 114 within which a heating element 116 and a sensing element 118 are disposed. The heating element 116 may include a ceramic heater or any other suitable electric powered heater configured to be selectively activated (e.g., by the controller 170) to heat the internal volume of the gas sensor housing 114, and thereby heat the sensing element 118 to an operating temperature of the sensing element 118, for example, equal to or greater than 600 degrees Celsius (e.g., about 600, 700, 800, or 900 degrees Celsius, inclusive). An aperture 119 may be defined at a tip 117 of the gas sensor housing 114 through which a portion of the exhaust gas can enter the gas sensor housing 114 and contact the sensing element 118 so as to allow the sensing element 118 to electronically measure an amount of the gas constituent (e.g., NOx amount) in the exhaust gas.

The primary factors that contribute to the power needed by the heating element 116 are the exhaust gas temperature and the velocity of the exhaust gas around the tip 117. Conventionally, physical gas sensors are located proximate to an inlet of the aftertreatment system 100, for example, in the inlet conduit 102, where high exhaust gas velocities are present due to the smaller cross-sectional width (e.g., diameter) of the inlet conduit 102 leading to high thermal losses. In contrast, the gas sensor 112 is disposed within the housing 101 of the aftertreatment system, which generally has a larger cross-sectional width than the inlet conduit 102 (e.g., about 2-3 times larger cross-sectional width than the inlet conduit 102). Therefore, the exhaust gas velocities in the housing 101, and thereby at the tip 117 of the gas sensor housing 114, are lower than the exhaust gas velocities in the inlet conduit 102. This reduces convective heat loss from the gas sensor housing 114 and thereby, the heating element 116, which reduces the amount of power needed by the heating element 116 to maintain the internal temperature of the gas sensor housing 114 at the operating temperature of the sensing element 118, and increases operational life of the gas sensor 112. Moreover, the gas sensor housing 114 may be structured to have a larger cross-section than conventional gas sensor housings, further reducing exhaust gas flow velocities around the gas sensor housing 114 and heat loss from the gas sensor 112.

An outlet sensor 107 may be positioned in the outlet conduit 104. The outlet sensor 107 may comprise a second NOx sensor configured to determine an amount of NOx gases expelled into the environment after passing through the SCR system 150. In other embodiments, the outlet sensor 107 may comprise a particulate matter sensor configured to determine an amount of particulate matter (e.g., soot included in the exhaust gas exiting the filter 140) in the exhaust gas being expelled into the environment. In still other embodiments, the outlet sensor 105 may comprise an ammonia sensor configured to measure an amount of ammonia in the exhaust gas flowing out of the SCR system 150, i.e., determine the ammonia slip. This may be used as a measure of a catalytic conversion efficiency of the SCR system 150 for adjusting an amount of reductant to be inserted into the SCR system 150, and/or adjusting a temperature of the SCR system 150, as described herein, so as to allow the SCR system 150 to effectively use the ammonia for catalytic decomposition of the NOx gases included in the exhaust gas flowing therethrough. The $AMO_X$ catalyst 160 may be positioned downstream of the SCR system 150 and formulated to decompose any unreacted ammonia that flows past the SCR system 150.

The filter 140 is disposed downstream of the oxidation catalyst 130 and upstream of the SCR system 150 and configured to remove particulate matter (e.g., soot, debris, inorganic particles, etc.) from the exhaust gas. In various embodiments, the filter 140 may include a ceramic filter. In some embodiments, the filter 140 may include a cordierite filter which can, for example, be an asymmetric filter. In yet other embodiments, the filter 140 may be catalyzed.

The SCR system 150 is formulated to decompose constituents of an exhaust gas flowing therethrough in the presence of a reductant, as described herein. In some embodiments, the SCR system 150 may include a selective catalytic reduction filter (SCRF). The SCR system 150 includes a SCR catalyst formulated to catalyze decomposition of the NOx gases into its constituents in the presence of a reductant. Any suitable SCR catalyst may be used such as, for example, platinum, palladium, rhodium, cerium, iron, manganese, copper, vanadium based catalyst, any other suitable catalyst, or a combination thereof. The SCR catalyst may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst. Such washcoat materials may comprise, for example, aluminum oxide, titanium dioxide, silicon dioxide, any other suitable washcoat material, or a combination thereof.

Although FIG. 1 shows only the oxidation catalyst 130, the filter 140, the SCR system 150, and the AMOx catalyst 160 disposed within the internal volume defined by the housing 101, in other embodiments, a plurality of aftertreatment components may be disposed within the internal volume defined by the housing 101 in addition to, or in place of the oxidation catalyst 130, the filter 140, the SCR system 150, and the $AMO_X$ catalyst 160. Such aftertreatment components may include, for example, a two-way catalyst, mixers, baffle plates, secondary filters (e.g., a secondary partial flow or catalyzed filter) or any other suitable aftertreatment component.

A reductant port 156 may be positioned on a sidewall of the housing 101 and structured to allow insertion of a reductant therethrough into the internal volume defined by the housing 101. The reductant port 156 may be positioned upstream of the SCR system 150 (e.g., to allow reductant to be inserted into the exhaust gas upstream of the SCR system 150) or over the SCR system 150 (e.g., to allow reductant to be inserted directly on the SCR system 150). Mixers, baffles, vanes or other structures may be positioned in the housing 101 upstream of the SCR system 150 (e.g., between the filter 140 and the SCR system 150) so as to facilitate mixing of the reductant with the exhaust gas.

The reductant storage tank 110 is structured to store a reductant. The reductant is formulated to facilitate decomposition of the constituents of the exhaust gas (e.g., NOx gases included in the exhaust gas). Any suitable reductant may be used. In some embodiments, the exhaust gas comprises a diesel exhaust gas and the reductant comprises a diesel exhaust fluid (DEF). For example, the DEF may comprise urea, an aqueous solution of urea, or any other fluid that comprises ammonia, by-products, or any other diesel exhaust fluid as is known in the arts (e.g., the DEF marketed under the name ADBLUE®). For example, the reductant may comprise an aqueous urea solution having a particular ratio of urea to water. In some embodiments, the reductant can comprise an aqueous urea solution including 32.5% by weight of urea and 67.5% by weight of deionized water, including 40% by weight of urea and 60% by weight of deionized water, or any other suitable ratio of urea to deionized water.

A reductant insertion assembly 120 is fluidly coupled to the reductant storage tank 110. The reductant insertion assembly 120 is configured to selectively insert the reductant into the SCR system 150 or upstream thereof, or upstream or into a mixer (not shown) positioned upstream of the SCR system 150. The reductant insertion assembly 120 may comprise various structures to facilitate receipt of the reductant from the reductant storage tank 110 and delivery to the SCR system 150, for example, pumps, valves, screens, filters, etc.

The aftertreatment system 100 may also include a reductant injector fluidly coupled to the reductant insertion assembly 120 and configured to insert the reductant (e.g., a combined flow of reductant and compressed air) into the SCR system 150. In various embodiments, the reductant injector may include a nozzle having predetermined diameter. In various embodiments, the reductant injector may be positioned in the reductant port 156 and structured to deliver a stream or a jet of the reductant into the internal volume of the housing 101 so as to deliver the reductant to the SCR system 150.

The controller 170 is operatively coupled to the first temperature sensor 103, the second temperature sensor 105, the gas sensor 112, the heater 108, and in some embodiments, the reductant insertion assembly 120, the hydrocarbon insertion assembly 122, and the outlet sensor 107. For example, the controller 170 may be configured to receive an upstream exhaust gas temperature signal from the first temperature sensor 103 and receive a downstream exhaust gas temperature signal from the second temperature sensor 105, for example, to determine the upstream exhaust gas temperature and the downstream exhaust gas temperature, respectively. The controller 170 may also be configured to selectively activate the heater 108, and/or a heater module coupled to the heater 108 so as to heat the exhaust gas flowing through the heater 108 towards the gas sensor 112, for heating the gas sensor 112. The controller 170 may also be configured to selectively activate the heating element 116 of the gas sensor 112 for heating the internal volume of the gas sensor housing 114 and thereby, the sensing element 118 to the operating temperature (e.g., equal to or greater than 600 degrees Celsius). The controller 170 may also be configured to selectively activate the sensing element 118 (e.g., once the temperature of the gas sensor is equal to or greater than the operating temperature), and receive a signal from the sensing element 118 to determine an amount of the exhaust gas constituent (e.g., an amount of $NO_X$ gases in the exhaust gas).

As previously described, under cold environmental conditions, water can condense on the sensing element 118 and the heating element 116 in the form of water droplets. Turning ON or activating the heating element 116 and/or the sensing element 118 before the condensed water has evaporated can lead to cracking of the heating element 116 and/or the sensing element 118 due to thermals stress. For example, activating the heating element 116 when the water droplets are still present can cause a sudden increase in the temperature of the heating element 116 and the sensing element 118, for example, up to 800 degrees Celsius. The water droplets may create a large thermal stress on the heating element 116 leading to cracking and eventually failure of the heating element 116, and thereby the gas sensor 112. Therefore, it is desirable to evaporate any condensate present on the heating element 116 before activating the heating element 116.

The controller 170 is configured to determine the upstream exhaust gas temperature upstream of the heater 108, for example, based on the exhaust gas temperature signal received from the first temperature sensor 103. The upstream exhaust gas temperature corresponds to the temperature of the exhaust gas entering the aftertreatment system 100. In response, to the upstream exhaust gas temperature being less than a first threshold, for example, the dew point temperature (e.g., 100 degrees Celsius), the controller 170 causes activation of the heater 108. For example, when the upstream exhaust gas temperature is less than the first threshold, it is likely that the temperature of the gas sensor 112 is also below the first threshold and condensate is present on the heating element 116. Activating the heater 108 by the controller 170 causes the heater 108 to heat the exhaust gas flowing therethrough towards the gas sensor 112, the heated exhaust gas causing faster increase in temperature of the internal volume of the gas sensor housing 114 and thereby, the heating element 116 towards the first threshold at which any water droplets evaporate from the heating element 116.

The controller 170 may also be configured to determine the downstream exhaust gas temperature downstream of the heater 108, for example, based on a signal received from the second temperature sensor 105. In response to the downstream exhaust gas temperature being equal to or greater than the first threshold, the controller 170 is configured to cause activation of the heating element 116. For example, the downstream exhaust gas temperature being equal to or greater than the first threshold may indicate that the temperature within the gas sensor housing 114, and thereby the temperature of the heating element 116 is equal to or above the first threshold at which it is safe to activate the heating element 116. In some embodiments, the first threshold may be set at a slightly higher temperature than the dew point temperature (e.g., 110, 120, 130, 140, or 150 degrees Celsius, inclusive) so as to ensure that all the water droplets have evaporated from the heating element 116.

The controller 170 may also be configured to supplement the heat provided by the heating element 116 with the heating provided by the heater 108, so as to reduce power consumed by the heating element 116 for heating the sensing element 118 to the operating temperature, and increasing the life of the gas sensor 112. For example, in response to the downstream exhaust gas temperature being less than a second threshold (e.g., the operating temperature of the sensing element 118) that is greater than the first threshold, the controller 170 is configured to maintain the heater 108 and the heating element 116 in their respective activated states, until the downstream exhaust gas temperature is equal to or greater than the second threshold. In this manner, less power may be needed by the heating element 116 for heating the internal volume of the gas sensor housing 114 to the operating temperature.

In some embodiments, once the temperature of the sensing element 112 is equal to or greater than the second threshold, the controller 170 may be configured to modulate a power of the heater 108 (e.g., between 10% and 100% by controlling an electrical power provided to the heater 108) and a power of the heating element 116 so as to maintain the sensing element 118 at or above the second threshold. For example, the controller 170 may modulate a power of the heater 108 based on a current downstream exhaust gas temperature and a desired downstream exhaust gas temperature and/or a current power of the heating element 116 to maintain the sensing element 118 at or above the second threshold. By using the heater 108 in addition to the heating element 116 to maintain the sensing element 118 at the second threshold (e.g., the operating temperature), a power consumed by the heating element 116 is reduced, which increases the operational life of the heating element 116 and, thereby the gas sensor 112.

In some embodiments, the controller 170 may also be configured to determine a SCR catalytic conversion efficiency of the SCR system 150 based on an inlet $NO_X$ amount of $NO_X$ gases entering the aftertreatment system 100 (e.g., determined by the gas sensor 112), and an outlet $NO_X$ amount of $NO_X$ gases exiting the aftertreatment system 100 (e.g., determined by the outlet sensor 107). For example, the controller 170 may determine a difference between the inlet $NO_X$ amount and the outlet $NO_X$ amount and determine the SCR catalytic conversion efficiency based on the difference.

In some embodiments, the controller 170 may be configured to determine an amount of reductant deposits deposited on the SCR system 150. For example, the controller 170 may be configured to determine the amount of reductant deposits based on the SCR catalytic conversion efficiency, and an amount of reductant inserted into the aftertreatment system 100 and/or an amount of ammonia slip. The controller 170 may include equations, algorithms or lookup tables to determine the amount of reductant deposits based on various operating parameters (e.g., amount of reductant inserted, engine operating parameters, upstream and/or downstream exhaust gas temperature, exhaust gas flow rate, etc.).

The controller 170 may also be configured to determine an amount of ammonia slip, i.e., an amount of ammonia gas in the exhaust gas downstream of the SCR system 150 based on the second sensor signal (e.g., an outlet $NO_X$ signal) received from the outlet sensor 105. For example, the controller 170 may be configured to correlate the outlet $NO_X$ amount measured by the outlet $NO_X$ sensor, and determine the amount of ammonia slip therefrom. The controller 170 may be configured to command the reductant insertion assembly 120 to adjust an amount of the reductant inserted into the aftertreatment system 100 based on the inlet $NO_X$ amount, the SCR catalytic conversion efficiency, an exhaust gas temperature at an inlet of the SCR system 150, an exhaust gas flow rate, and/or any other exhaust gas parameter.

The controller 170 may be operably coupled to the engine 10, the first temperature sensor 103, the second temperature sensor 105, the heater 108, the gas sensor 112, the outlet sensor 107, the reductant insertion assembly 120, the hydrocarbon insertion assembly 122, and various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

Figure 3:
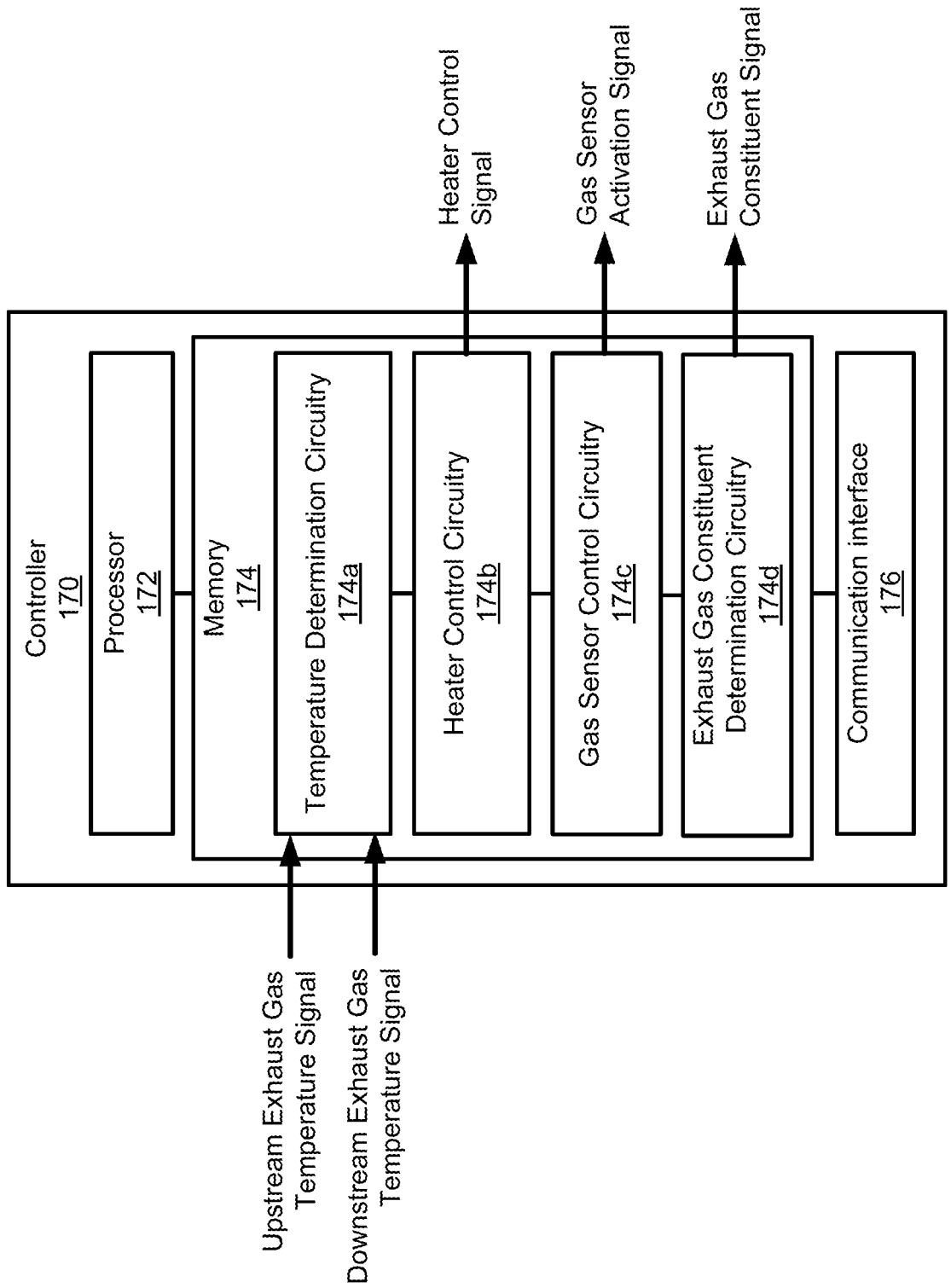
FIG. 3 is a schematic block diagram of a controller that may be included in the aftertreatment system of FIG. 1, according to an embodiment.

In some embodiments, the controller 170 includes various circuitries or modules configured to perform the operations of the controller 170 described herein. For example, FIG. 3 shows a schematic block diagram of the controller 170, according to an embodiment. The controller 170 may include a processor 172, a memory 174, or any other computer readable medium, and a communication interface 176. Furthermore, the controller 170 includes a temperature determination circuitry 174a, a heater control circuitry 174b, a gas sensor control circuitry 174c, and an exhaust gas constituent determination circuitry 174d. It should be understood that FIG. 2 shows only one embodiment of the controller 170 and any other controller capable of performing the operations described herein can be used.

The processor 172 can include a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the temperature determination circuitry 174a, the heater control circuitry 174b, the gas sensor control circuitry 174c, and the exhaust gas constituent determination circuitry 174d, are embodied as machine or computer-readable media (e.g., stored in the memory 174) that is executable by a processor, such as the processor 172. As described herein and amongst other uses, the machine-readable media (e.g., the memory 174) facilitates performance of certain operations of the temperature determination circuitry 174a, the heater control circuitry 174b, the gas sensor control circuitry 174c, and the exhaust gas constituent determination circuitry 174d to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the temperature determination circuitry 174a, the heater control circuitry 174b, the gas sensor control circuitry 174c, and the exhaust gas constituent determination circuitry 174d are embodied as hardware units, such as electronic control units. As such the temperature determination circuitry 174a, the heater control circuitry 174b, the gas sensor control circuitry 174c, and the exhaust gas constituent determination circuitry 174d may be embodied as one or more circuitry components including, but not limited to, processing circuitry, network interfaces, peripheral devices, input devices, output devices, sensors, etc.

In some embodiments, the temperature determination circuitry 174a, the heater control circuitry 174b, the gas sensor control circuitry 174c, and the exhaust gas constituent determination circuitry 174d may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the temperature determination circuitry 174a, the heater control circuitry 174b, the gas sensor control circuitry 174c, and the exhaust gas constituent determination circuitry 174d may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the temperature determination circuitry 174a, the heater control circuitry 174b, the gas sensor control circuitry 174c, and the exhaust gas constituent determination circuitry 174d may also include programmable hardware devices such as field programmable gate arrays, programmable array logic, programmable logic devices or the like. In this regard, the temperature determination circuitry 174a, the heater control circuitry 174b, the gas sensor control circuitry 174c, and the exhaust gas constituent determination circuitry 174*d* may include one or more memory devices for storing instructions that are executable by the processor(s) of the temperature determination circuitry 174*a*, the heater control circuitry 174*b*, the gas sensor control circuitry 174*c*, and the exhaust gas constituent determination circuitry 174*d*. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the temperature determination circuitry 174*a*, the heater control circuitry 174*b*, the gas sensor control circuitry 174*c*, and the exhaust gas constituent determination circuitry 174*d*. Thus, the depicted configuration represents the aforementioned arrangement in which the temperature determination circuitry 174*a*, the heater control circuitry 174*b*, the gas sensor control circuitry 174*c*, and the exhaust gas constituent determination circuitry 174*d* are embodied as machine or computer-readable media. However, as mentioned above, this illustration is not meant to be limiting as the present disclosure contemplates other embodiments such as the aforementioned embodiment where the temperature determination circuitry 174*a*, the heater control circuitry 174*b*, the gas sensor control circuitry 174*c*, and the exhaust gas constituent determination circuitry 174*d* g, or at least one circuit of the temperature determination circuitry 174*a*, the heater control circuitry 174*b*, the gas sensor control circuitry 174*c*, and the exhaust gas constituent determination circuitry 174*d* are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the temperature determination circuitry 174*a*, the heater control circuitry 174*b*, the gas sensor control circuitry 174*c*, and the exhaust gas constituent determination circuitry 174*d*) may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the engine 10, the first temperature sensor 103, the second temperature sensor 105, the gas sensor 112, the heater 108, the outlet sensor 107, the reductant insertion assembly 120, and/or the hydrocarbon insertion assembly 122. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The temperature determination circuitry 174*a* is configured to receive the upstream exhaust gas temperature signal from the first temperature sensor 103 and determine the upstream exhaust gas temperature therefrom, i.e., the temperature of the exhaust gas upstream of the heater 108. Moreover, the temperature determination circuitry 174*a* receives the downstream exhaust gas temperature signal from the second temperature sensor 105 and determines the downstream exhaust gas temperature, i.e., the temperature of the exhaust gas downstream of the heater 108. In some embodiments, the temperature determination circuitry 174*a* may be configured to virtually determine the upstream and downstream exhaust gas temperatures, for example, based on various engine operating parameters, exhaust gas flow rate, power being consumed by the heater, ambient temperature, etc. In various embodiments, the temperature determination circuitry 174*a* may receive temperature signals from various temperature sensors provided at various locations of the aftertreatment system 100 and determine the exhaust gas temperature at each of these locations of the aftertreatment system 100.

The heater control circuitry 174*b* may be configured to selectively activate or deactivate the heater 108 and/or modulate the power to the heater 108 so as to control the downstream exhaust gas temperature. For example, the heater control circuitry 174*b* may be configured to generate a heater control signal to cause activation of the heater 108 in response to the upstream exhaust gas temperature being less than the first threshold. The heater control circuitry 174*b* may also be configured to maintain activation of the heater 108 in response to the downstream exhaust gas temperature being less than the second threshold. Moreover, the heater control circuitry 174*b* may be configured to modulate the power of the heater 108 so as to maintain the temperature of the gas sensor 112 at the operating temperature, as previously described.

The gas sensor control circuitry 174*c* may be configured to selectively activate the heating element 116 and/or the sensing element 118 of the gas sensor 112. For example, the gas sensor control circuitry 174*c* may be configured to selectively activate the heating element 116 once the downstream exhaust gas temperature is equal to or greater than the first threshold. The gas sensor control circuitry 174*c* may also be configured to maintain the heating element 116 in the activated state in response to the downstream exhaust gas temperature being less than the second threshold. Moreover, the gas sensor control circuitry 174*c* may be configured to modulate the power being consumed by the heating element 116 to maintain the temperature of the gas sensor 112 at the operating temperature.

Furthermore, the gas sensor control circuitry 174c may be configured to cause activation of the sensing element 118 once the downstream exhaust gas temperature and/or the heating element temperature (e.g., determined based on a power being consumed by the heating element 116 and/or the downstream exhaust gas temperature) being equal to or greater than the second threshold.

The exhaust gas constituent determination circuitry 174d is configured to receive an exhaust gas constituent signal from the sensing element 118 and determine the amount of exhaust gas constituent (e.g., $NO_X$ amount) in the exhaust gas entering the aftertreatment system 100.

Figure 5:
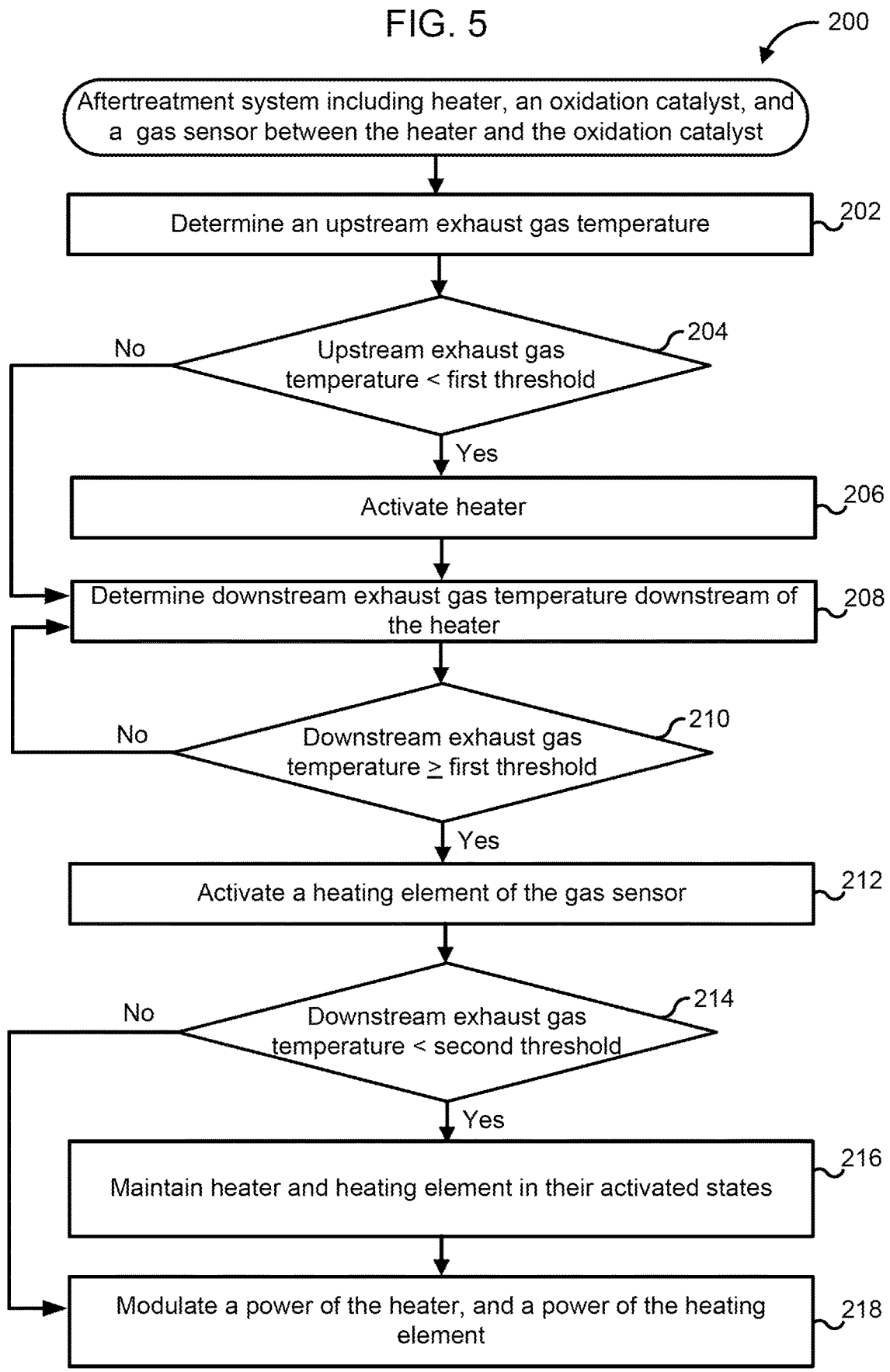
FIG. 5 is a schematic flow chart of a method for thermal management of a gas sensor included in an aftertreatment system, according to an embodiment.

FIG. 5 is schematic flow chart of an example method 200 for thermal management of a gas sensor (e.g., the gas sensor 112) included in an aftertreatment system (e.g., the aftertreatment system 100) that includes at least a heater (e.g., the heater 108), an oxidation catalyst (e.g., the oxidation catalyst 130), and the gas sensor disposed downstream of the heater and upstream of the oxidation catalyst (e.g., within the housing 101 within which the oxidation catalyst 130 is disposed), according to an embodiment. While described with reference to the controller 170, the heater 108, and the gas sensor 112, the operations of the method 200 can be used with any controller included in any aftertreatment system that includes a heater and a physical gas sensor.

The method 200 includes determining, by the controller 170, the upstream exhaust gas temperature, at 202. For example, the controller 170 may receive a signal from the first temperature sensor 103 to determine the upstream exhaust gas temperature of the exhaust gas entering the aftertreatment system. At 204, the controller 170 determines whether the upstream exhaust gas temperature is less than the first threshold. In response to the upstream exhaust gas temperature being less than the first threshold (204:YES), the method 200 moves to operation 206, and the controller 170 causes activation of the heater 108.

In response to the upstream exhaust gas temperature being greater than the first threshold (204:NO), or after activating the heater at operation 206, the controller 170 determines the downstream exhaust gas temperature (e.g., based on the downstream exhaust gas temperature signal received from the second temperature sensor 105), at 208. At 210, the controller 170 determines whether the downstream exhaust gas temperature is equal to or greater than the first threshold. In response to the downstream exhaust gas temperature being less than the first threshold (210:NO), the method 200 returns to operation 208. In response to the downstream exhaust gas temperature being greater than the first threshold (210:YES), the controller 170 causes activation of the heating element 116 of the gas sensor 112, at 212.

In some embodiments, the method 200 also includes determining, by the controller 170, whether the downstream exhaust gas temperature is less than the second threshold (e.g., the operating temperature), at 214. In response to the downstream exhaust gas temperature being less than the second threshold (214:YES), the controller 170 maintains the heater 108 and the heating element 116 in their respective activated state, at 216, for example, until the downstream exhaust gas temperature and/or a temperature of the gas sensor 112 (e.g., a temperature of the internal volume of the gas sensor housing 114) is equal to or greater than the second threshold. In response to the downstream exhaust gas temperature being equal to or greater than the second threshold (214:NO), or once the downstream exhaust gas temperature and/or a temperature of the gas sensor 112 reaches the second threshold, the controller 170 modulates the power of the heater 108 and the heating element 116 to maintain the temperature of the sensing element 118 at or about the second threshold, at 218.

FIG. 6 is schematic flow chart of an example method 300 for thermal management of a gas sensor (e.g., the gas sensor 112) included in an aftertreatment system (e.g., the aftertreatment system 100) that includes at least a heater (e.g., the heater 108), an oxidation catalyst (e.g., the oxidation catalyst 130), and the gas sensor disposed downstream of the heater and upstream of the oxidation catalyst (e.g., within the housing 101 within which the oxidation catalyst 130 is disposed), according to another embodiment. While described with reference to the controller 170, the heater 108, and the gas sensor 112, the operations of the method 200 can be used with any controller included in any aftertreatment system that includes a heater and a physical gas sensor.

The method 300 includes determining, by the controller 170, the downstream exhaust gas temperature (e.g., based on a signal received from the second temperature sensor 105), at 302. At 304, the controller 170 determines whether the downstream exhaust gas temperature is less than a threshold (e.g., the second threshold or otherwise the operating temperature). In response to the temperature being greater than the threshold (304:NO), the method 300 proceeds to operation 312, and the controller 170 modulates the power of the heater 108 and the heating element 116 to maintain the temperature of the sensing element at or about the second threshold.

In response to the temperature being less than the threshold (304:YES), the controller 170 activates the heater 108, at 306. At 308, the controller 170 causes activation of the heating element 116 in response to the downstream exhaust gas temperature being equal to or greater than a dew point temperature (e.g., the first threshold). At 310, the controller 170 determines whether the downstream exhaust gas temperature is equal to or greater than the threshold. In response to the downstream exhaust gas temperature still being less than the threshold (310:NO), the method 300 returns to operation 306 and the controller 170 continues to maintain the heater 108 and the heating element 116 in their respective activated states. On the other hand, if the downstream exhaust gas temperature is equal to or greater than the threshold (310:YES), the method 300 proceeds to operation 312, and the controller 170 modulates the power of the heater 108 and the heating element 116 to maintain the temperature of the sensing element 118 at or about the second threshold.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system for treating an exhaust gas produced by an engine, the aftertreatment system comprising:
   a heater configured to selectively heat the exhaust gas entering the aftertreatment system;
   an aftertreatment component disposed downstream of the heater;
   a gas sensor disposed downstream of the heater and upstream of the aftertreatment component, the gas sensor comprising:
     a sensing element, and
     a heating element configured to selectively heat the sensing element to an operating temperature of the sensing element; and
   a controller configured to:
     determine an upstream exhaust gas temperature of the exhaust gas upstream of the heater,
     in response to the upstream exhaust gas temperature being less than a first threshold, cause activation of the heater,
     determine a downstream exhaust gas temperature of the exhaust gas downstream of the heater, and
     in response to the downstream exhaust gas temperature being equal to or greater than the first threshold, cause activation of the heating element of the gas sensor.

2. The aftertreatment system of claim 1, further comprising:
   a housing, the aftertreatment component and the gas sensor being disposed in the housing.

3. The aftertreatment system of claim 1, wherein the first threshold is 100 degrees Celsius.

4. The aftertreatment system of claim 1, wherein:
   the controller is further configured to:
     in response to the downstream exhaust gas temperature being less than a second threshold that is greater than the first threshold, maintain the heater and the heating element in their respective activated states until the downstream exhaust gas temperature reaches the second threshold.

5. The aftertreatment system of claim 4, wherein the controller is further configured to modulate a power of the heater and a power of the sensing element to maintain the sensing element at the second threshold.

6. The aftertreatment system of claim 1, wherein:
   the controller is further configured to:
     activate the sensing element simultaneously with or subsequent to activating the heating element, and
     determine an amount of exhaust gas constituents in the exhaust gas based on a signal received from the sensing element.

7. The aftertreatment system of claim 1, wherein the aftertreatment component comprises at least one of an oxidation catalyst, a filter, a selective catalytic reduction system, or a two-way catalyst.

8. The aftertreatment system of claim 7, wherein the aftertreatment component comprises the oxidation catalyst, the gas sensor being disposed between the heater and the oxidation catalyst.

9. The aftertreatment system of claim 1, wherein the heater comprises an electrical heater.

10. A controller for an aftertreatment system that comprises an aftertreatment component, a heater disposed upstream of the aftertreatment component, and a gas sensor comprising a sensing element and a heating element disposed downstream of the heater and upstream of the aftertreatment component, the controller configured to:
    determine an upstream exhaust gas temperature of the exhaust gas upstream of the heater;
    in response to the upstream exhaust gas temperature being less than a first threshold, cause activation of the heater;
    determine a downstream exhaust gas temperature of the exhaust gas downstream of the heater; and
    in response to the downstream exhaust gas temperature being equal to or greater than the first threshold, cause activation of the heating element of the gas sensor.

11. The controller of claim 10, wherein the first threshold is 100 degrees Celsius.

12. The controller of claim 10, wherein the controller is further configured to:
    in response to the downstream exhaust gas temperature being less than a second threshold that is greater than the first threshold, maintain the heater and the heating element in their respective activated states until the downstream exhaust gas temperature reaches the second threshold.

13. The controller of claim 12, wherein the controller is further configured to modulate a power of the heater and a power of the sensing element to maintain the sensing element at the second threshold.

14. The controller of claim 10, wherein the controller is further configured to:
    activate the sensing element simultaneously with or subsequent to activating the heating element; and
    determine an amount of exhaust gas constituents in the exhaust gas based on a signal received from the sensing element.

15. A method for treating an exhaust gas produced by an engine, the method comprising:
    determining, by a controller, an upstream exhaust gas temperature of an exhaust gas flowing through an aftertreatment system upstream of a heater of the aftertreatment system, the aftertreatment system comprising a gas sensor comprising a sensing element and a heating element disposed downstream of the heater and upstream of an aftertreatment component of the aftertreatment system;

in response to the upstream exhaust gas temperature being less than a first threshold, causing, by the controller, activation of the heater;

determining, by the controller, a downstream exhaust gas temperature of the exhaust gas downstream of the heater; and in response to the downstream exhaust gas temperature being equal to or greater than the first threshold, causing, by the controller, activation of the heating element of the gas sensor.

16. The method of claim 15, further comprising:

in response to the downstream exhaust gas temperature being less than a second threshold that is greater than the first threshold, maintaining, by the controller, the heater and the heating element in their respective activated states until the downstream exhaust gas temperature reaches the second threshold.

17. The method of claim 16, further comprising:

modulating, by the controller, a power of the heater and a power of the sensing element to maintain the sensing element at the second threshold.

18. The method of claim 15, further comprising:

activating, by the controller, the sensing element simultaneously with or subsequent to activating the heating element; and determining, by the controller, an amount of exhaust gas constituents in the exhaust gas based on a signal received from the sensing element.

* * * * *